Figure 1:
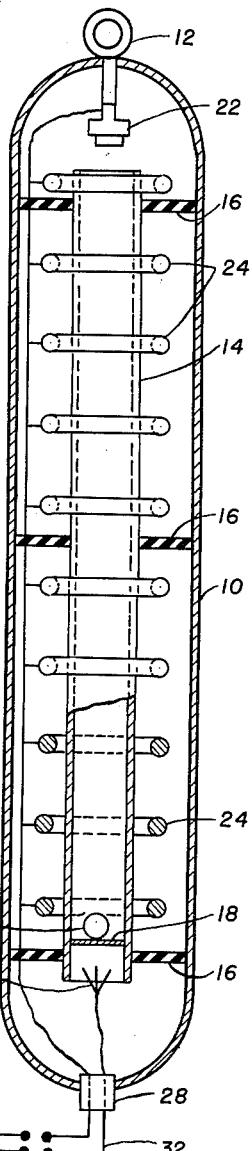
Figure 2:
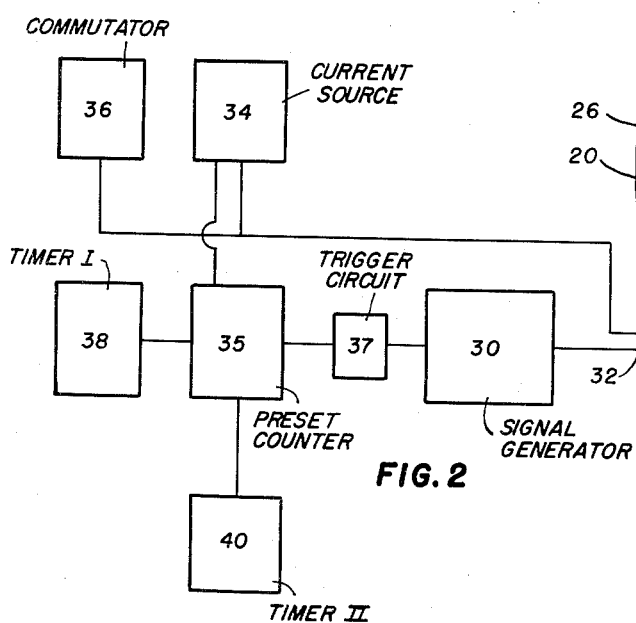

April 3, 1962  H. A. SLACK ETAL  3,027,767
ELECTRONIC GRAVITY METER
Filed Dec. 24, 1958

INVENTORS
HOWARD A. SLACK
BY GEORGE D. BRUNTON

ATTORNEY

United States Patent Office 3,027,767
Patented Apr. 3, 1962

3,027,767
ELECTRONIC GRAVITY METER
Howard A. Slack and George D. Brunton, Crystal Lake, Ill., assignors to The Pure Oil Company, Chicago, Ill., a corporation of Ohio
Filed Dec. 24, 1958, Ser. No. 782,764
11 Claims. (Cl. 73—382)

This invention relates to an apparatus for measuring the strength of the gravitational field of the earth, and pertains more particularly to an electronic gravity meter adapted for making gravity measurements within well boreholes.

Various gravity meters are well known to the art for use in making gravity surveys while the instrument is positioned on the surface of the earth. Such gravity meters commonly rely on a mechanical system to weigh a mass, and thereby measure the force of the earth's gravitational field at a given point. Such instruments are extremely sensitive to mechanical vibrations, and therefore are limited to use at fixed stations on the earth's surface, where they can be protected and operated under very stable conditions.

In exploring for subterranean ore and petroleumn deposits, it is desirable to be able to determine the presence of sub-surface rock strata and anomalies which might be indicative of the presence of ore or petroleum. One means of determining the presence of such strata or anomalies is by measurement of the force of the earth's gravitational field at a number of points in an area under study. Variations in the gravitational force can be noted, and from this, variations in underground strata can be deduced. This method is subject to the limitation that the same variation in gravity might be caused by either a large mass at a great depth, or a small mass at a lesser depth, or by a variation in depth of a continuous stratum, either of which can lead to the formulation of erroneous conclusions. Consequently, it is desirable to determine the gravitational force at at least two levels as in aid in more accurately deducing the true characteristics of the anomaly responsible for the variation in the earth's gravitational field.

Gravity meters and torsion balances, because of their complex mechanical linkages, are extremely sensitive to mechanical vibrations, and their use has been restricted to fixed stations on the surface of the earth where the instruments can be carefully protected from vibrations and operated under stable conditions. Attempts to use such gravity meters in aircraft have failed. The use of gravity meters in boreholes has been restricted by the physical dimensions of the hole and the difficulty of designing a gravity meter insertable therein.

It is a primary object of this invention to provide an apparatus for taking gravitational measurements within a well borehole. It is a further object of this invention to provide an electronically-operated gravity meter of high accuracy.

Yet another object of this invention is to provide an electronic gravity meter so constructed that it is relatively insensitive to mechanical vibration or shock.

Still another object of this invention is to provide a gravity meter insertable in a borehole so that gravitational measurements can be made at various levels in said borehole and the gravitational readings can be noted directly on an instrument at the surface of the earth.

Briefly, this invention resides in an apparatus for accurately measuring the acceleration of a freely falling body, in vacua. The apparatus consists of a hollow waveguide through which a magnetic body is dropped against a very high-frequency signal. As the body falls a given distance, equal to the wave length of the signal, a standing wave or resonance is established. The rate at which the standing wave occurs is directly proportional to the velocity at which the object falls, and therefore, is proportional to the force of gravity. The apparatus of this invention includes suitable electronic equipment for producing the very-high-frequency signal and for detecting and measuring the frequency at which the standing waves are produced.

This invention is thus described with reference to the drawings, of which:

FIGURE I is a front elevation, partly in section, of the gravity meter of this invention.

FIGURE II is a schematic diagram of the preferred electronic measuring equipment which is used in conjunction with the gravity meter of FIGURE I.

Referring to FIGURE I, vessel 10 is a vacuum chamber fabricated from a non-magnetic material, such as aluminum, bronze, or molded plastic. The vacuum within vessel 10 should be as great as possible, the pressure being not greater than $10^{-7}$ mm. of mercury, absolute. Vessel 10 is equipped with a suspension ring 12, by which it may be lowered into a borehole by a cable. Wave-guide 14 is suspended within vessel 10 by 3 supports, such as rubber mount discs 16. Wave-guide 14 may be of rectangular or cylindrical cross-section, and is of conventional design. The dimensions of the wave-guide are not critical, but should be selected to correspond to the frequency of the signal with which it is to be used. For example, a wave-guide for use with a frequency of 3,000 megacycles, which will have a wave-length of 10 cm., can conveniently be used with a wave-guide comprising a cylindrical brass pipe having an outside diameter of 3 inches and a wall-thickness of $1/16$ inch. Alternatively, a rectangular tube having cross-sectional dimensions of 1¾ inches by 2½ inches and a wall-thickness of 0.081 inch may be used. Outside dimensions are specified because they are most commonly quoted by American manufacturers. The length of wave-guide 14 is not critical, but a length of about 100 cm. is preferred.

Both ends of the wave-guide are open, but nylon net 18 may be fastened rigidly within the wave-guide adajcent to its lower end. Antenna 20 is located adjacent to the lower end of the wave-guide below nylon net 18. It is supported in place by a suitable antenna insulator which is not shown in the drawing. Adjacent to the upper end of wave-guide 14 is electro-magnet 22. Electro-magnet 22 is shown supported by the top portion of vessel 10, but alternatively could be supported by the top of the wave-guide. Coils 24 are mounted at suitable intervals along the length of wave-guide 14. They are preferably supported from the outside surface of the wave-guide. Magnetic body 26, which may be a sphere or disc constructed of soft iron, is shown at rest on nylon net 18. Electrical conductors which are connected to antenna 20, electro-magnet 22, and coils 24 pass out of the vessel through sealing plug 28, which supports the conductors in electrically-insulated relationship and prevents leakage into the evacuated vessel.

Referring to FIGURE II, ultra-high-frequency generator 30, which may be any closely-controlled sine-wave signal generator, but is preferably a Hewlett-Packard 616A signal generator, feeds a closely-controlled, 3000-megacycle signal through coaxial cable 32 to antenna 20. Generator 30 is crystal-controlled for absolute frequency stability. Direct-current source 34 may be a battery or a D.C. generator. Preset counter 35 is preferably a Berkely Dual Preset Counter Model 5442. Direct-current source 34, which supplies electric current to energize electro-magnet 22 and coils 24 is controlled by preset counter 35. Direct-current generator-commutator 36 distributes electric current in sequence to each of coils 24.

Thus the lowest coil is energized first, then the second lowest coil is energized, and so on vertically upward along the length of the wave-guide, each coil being energized in turn.

The power monitor of signal generator 30 actuates trigger circuit 37, which is preferably a standard Schmitt circuit. Contained within trigger circuit 37 is a "flip-flop" circuit which produces a standard pulse of fixed amplitude and very short duration. The pulses emanating from this circuit actuate preset counter 35. Preset counter 35, when so actuated, simultaneously breaks the connection between power source 34 and electro-magnet 22, and energizes electronic timers 38 and 40. These timers are preferably Hewlett-Packard Model 523B 1-megacycle electronic timers.

While the electronic circuits of the apparatus of this invention have been depicted schematically and described briefly, all of the separate electronic devices and circuits are well known to those skilled in the art and are commercially available. Substitute circuits and components will be obvious to those skilled in the art, and may be freely substituted for the devices specifically named in this specification.

In operation, the sonde depicted in FIGURE I is lowered in a borehole to any desired depth. Electrical conductors connect the sonde to the electronic equipment of FIGURE II which preferably remains on the surface of the earth. Magnetic body 26 is held by elecro-magnet 22 until released by interruption of the flow of current from direct source 34. This interruption of current is caused by a signal from preset counter 35. The falling body 26 is prevented from striking antenna 20 by nylon net 18 which breaks the fall of body 26. Body 26 is returned to electro-magnet 22 at the top of the wave-guide by coils 24 which are energized successively from bottom to top by direct-current generator-commutator 36. This operation may be controlled manually, or an automatic system may be actuated by a signal generated by a relay switch attached to nylon net 18. The function of the nylon net is merely to protect the antenna from being damaged by the falling body 26. Equivalent protective devices may be employed, or the falling body may be made of a magnetic material, such as steel wool, which can fall against the antenna without causing damage. In falling through wave-guide 14, magnetic body 26 generates a standing wave, or resonance, within the wave-guide at every 10 cm. increment of fall, when the frequency of the high-frequency signal from antenna 20 is exactly 3,000 megacycles. Ten such standing waves occur during the fall of the magnetic body when the total length of fall is 100 cm. While this length of fall is not critical, it is apparent that the accuracy of measurement of the time of fall is directly proportional to the number of standing waves generated during the fall. A 100 cm. fall is suitable when the frequency of the signal generated by signal generator 30 and radiated from antenna 20 is 3,000 megacycles.

The exact choice of frequency to be propagated in the wave-guide is not critical, but the frequency must be known and maintained with great precision. The choice of frequency will depend on the mechanical properties of the wave-guide and signal generator, and from a practical standpoint, on the availability and cost of such equipment. The choice of 3,000 megacycles is based on commercially-available signal generators and wave-guides which operate at this frequency.

A resonant condition in wave-guide 14 is detected as a decrease in the output power of high-frequency-signal generator 30. The power monitor of signal generator 30 actuates trigger circuit 37 when such power maximum occur. The standard pulse produced by the trigger circuit must be of fixed amplitude and very short duration. It is evident that 10 pulses occur during the fall of body 26 through a distance of 100 cm. within the wave-guide.

Preset counter 35, when energized, simultaneously releases magnetic body 26 and actuates electronic timers 38 and 40. It is evident that as the falling body 26 passes each point of resonance along its path toward nylon screen 18, the output power of signal generator 30 reaches a minimum and a standard pulse is fed to preset counter 35. After a preset number of pulses, e.g., 3, preset counter 35 de-energizes electronic timer 38, and the time of fall of body 26 from electro-magnet 22 to the point of occurrence of the third resonance is recorded on timer 338. After a preset larger number of pulses, e.g., 10, preset counter 337 de-energizes timer 40, thereby recording the time of the fall of body 26 from the magnet to the point of occurrence of the 10th resonance. It will be seen that the time at which every resonance occurs in the wave guide is not recorded, but that the intervals between the actuation of the preset counter, which starts the timers, and the stopping of the timers at the predetermined resonance occurrences (third and tenth occurrences in the foregoing example), are recorded. The output of the signal geneartor is reduced at the points of resonance by the loading imposed at the wave guide, and this condition is sensed by the signal generator power monitor, which is electrically connected to the actuates the trigger circuit. The trigger circuit produces standard pulses which are transmitted to the preset counter. The preset counter counts the pulses and stops the first timer after the third pulse and the second timer after the tenth pulse. The distance $D_1$ of fall from the magnet to the point of the 3rd resonance and the distance $D_2$ of fall from the magnet to the point of the 10th resonance are related to the times $t_1$ and $t_2$, for each fall, respectively, by the relation, $$D = \tfrac{1}{2} g t_2$$

Consequently, $$D_2 - D_1 = 1/2\ g\ (t_2^2 - t_1^2)$$

and $$g = \frac{2(D_2 - D_1)}{(t_2^2 - t_1^2)}$$

where $g$ is the acceleration due to gravity expressed in cm. sec.$^2$. Times $t_1$ and $t_2$ appear on timers 38 and 40, respectively. Since, after the falling body reaches the first point of resonance, another point of resonance is reached after each successive fall through a distance of exactly 10 cm., it is evident that the distance $D_2 - D_1$ is equal to a multiple of 10 cm. Since the number of pulses occurring between the times when timers 38 and 40 are de-energized, is 10—3 or 7 pulses, it is seen that during the time interval from $t_1$ to $t_2$ the falling body dropped a distance of 7 wave lengths. Thus the distance $D_2 - D_1$ exactly equals 70 cm.

In the example stated, the distance 70 cm. may be substituted for the expression $D_2 - D_1$, and the times $t_1$ and $t_2$ recorded on timers 38 and 40, respectively, may also be substituted in the last-stated equation. The strength of the gravitational field of the earth is thus readily determined.

While in the aforedescribed embodiment of the apparatus of this invention vessel 10 is so shaped that it may be inserted into a well-bore, it is obvious that the gravity meter of this invention can be used on the surface of the earth or in aircraft as well. When used on the surface of the earth or in aircraft, it may be desirable to modify the shape of the vacuum vessel. Coils 24 may be omitted, and body 26 returned to its position adjacent to electro-magnet 22 by the simple expedient of turning the vessel upside down and then returning it to its original vertical position. Other modifications of the preferred embodiments of this invention set out above will be obvious to those skilled in the art. The invention must therefore be deemed to include equivalent electrical circuits and mechanical structures within the scope of the appended claims.

What is claimed is:

1. A gravity meter comprising a vessel capable of holding a vacuum, a wave-guide supported within said vessel, means for propagating a high-frequency electromagnetic signal within said wave-guide, a body adapted for free fall within said wave-guide, means adjacent one end of said wave guide for releasably holding said body in a position for said body to fall within said wave guide when released, and means for detecting the times of occurrence of resonance in said wave-guide as said body falls therethrough.

2. An apparatus according to claim 1 including a nylon net rigidly supported within said wave-guide adjacent the end thereof remote from said releasably holding means, for stopping the fall of said free-falling body.

3. An apparatus according to claim 1 in which the means for releasably holding said body comprises an electro-magnet supported adjacent to one end of said wave-guide, and said freely-falling body is composed of magnetic metal.

4. An apparatus according to claim 3 including means for returning said freely-falling body through the wave-guide to said electro-magnet.

5. An apparatus according to claim 4 in which the means for returning said freely-falling body comprises a plurality of electrical coils spaced along the length of said wave-guide and supported externally with respect to said wave-guide.

6. An apparatus according to claim 1 in which said vessel comprises a thin elongated member insertable into a well-bore.

7. An apparatus according to claim 1 wherein the length of said wave-guide is about 100 cm. and the frequency of said signal is about 3,000 megacycles.

8. An apparatus according to claim 5 in which said body is composed of steel wool.

9. In a gravity meter for determining the rate of fall of a body in a vacuum, the combination comprising a vessel capable of holding a vacuum, a wave-guide supported within said vessel, an antenna supported adjacent to one end of said wave-guide for radiating high frequency electro-magnetic waves within said wave-guide, means adjacent one end of said wave-guide for releasably holding said body in a position for said body to fall within said wave-guide when released, and electrical conductor means connected at one end to said antenna and extending through said vessel to the exterior thereof.

10. An apparatus according to claim 9 including a body adapted for free fall within said wave-guide disposed therein.

11. An apparatus according to claim 10 including a fixed-frequency signal generator connected to said conductor externally of said vessel, means electrically connected to said signal generator for detecting reductions in the output of said generator occurring in response to resonance in said wave-guide and producing an electrical pulse in response to said reductions, a plurality of timers, and a pulse counter electrically connected to said last-named means for counting pulses emanating therefrom and deenergizing said timers after a predetermined number of pulses are counted.

References Cited in the file of this patent

UNITED STATES PATENTS

| | | |
|---|---|---|
| 1,917,847 | Klopsteg | July 11, 1933 |
| 2,570,659 | Fay et al. | Oct. 9, 1951 |
| 2,691,761 | Smith | Oct. 12, 1954 |

UNITED STATES PATENT OFFICE

CERTIFICATE OF CORRECTION

Patent No. 3,027,767                                     April 3, 1962

Howard A. Slack et al.

It is hereby certified that error appears in the above numbered patent requiring correction and that the said Letters Patent should read as corrected below.

Column 1, line 24, for "petroleumn" read -- petroleum --; column 3, line 70, for "maximum" read -- minimum --; column 4, line 10, for "338" read -- 38 --; line 11, for "337" read -- 37 --; line 20, for "geneartor" read -- generator --; line 23, for "the", first occurrence, read -- and --.

Signed and sealed this 9th day of October 1962.

(SEAL)
Attest:

ERNEST W. SWIDER                                   DAVID L. LADD
Attesting Officer                                       Commissioner of Patents